United States Patent
Kasai et al.

(10) Patent No.: US 6,964,605 B2
(45) Date of Patent: Nov. 15, 2005

(54) PRODUCTION METHOD OF NATURAL INTESTINE SAUSAGE AND DEVICE THEREFOR

(75) Inventors: Minoru Kasai, Kanagawa (JP); Minoru Nakamura, Kanagawa (JP); Hideaki Arai, Kanagawa (JP); Nobuo Kimura, Kanagawa (JP)

(73) Assignee: HITEC Co., Ltd., Yokohama (JP)

(*) Notice: Subject to any disclaimer, the term of this patent is extended or adjusted under 35 U.S.C. 154(b) by 0 days.

(21) Appl. No.: 10/088,228

(22) PCT Filed: Jul. 18, 2001

(86) PCT No.: PCT/JP01/06222

§ 371 (c)(1),
(2), (4) Date: Mar. 19, 2002

(87) PCT Pub. No.: WO02/07524

PCT Pub. Date: Jan. 31, 2002

(65) Prior Publication Data

US 2002/0137451 A1 Sep. 26, 2002

(30) Foreign Application Priority Data

Jul. 21, 2000 (JP) ........................................ 2000-220774

(51) Int. Cl.$^7$ .............................................. A22C 11/00
(52) U.S. Cl. ......................................................... 452/32
(58) Field of Search ............................. 452/46, 51, 32, 452/22, 30, 21, 24, 35, 37

(56) References Cited

U.S. PATENT DOCUMENTS

| 3,315,300 | A | * | 4/1967 | Ziolko ........................ 264/40.1 |
| 4,044,426 | A | * | 8/1977 | Kupcikevicius et al. ...... 452/31 |
| RE30,390 | E | * | 9/1980 | Kupcikevicius et al. ...... 452/31 |
| 4,417,434 | A | * | 11/1983 | Piereder ...................... 452/37 |
| 4,547,932 | A | * | 10/1985 | Romeike et al. ............. 452/26 |
| 4,563,792 | A | * | 1/1986 | Niedecker .................... 452/31 |
| 4,773,127 | A | * | 9/1988 | Stall ........................... 452/24 |
| 5,087,463 | A | * | 2/1992 | Raudys et al. ............. 426/105 |
| 5,145,449 | A | * | 9/1992 | Kazaitis et al. .............. 452/29 |
| 5,273,482 | A | * | 12/1993 | Beckman et al. ........ 138/118.1 |
| 5,480,346 | A | | 1/1996 | Kasai |
| 5,830,050 | A | | 11/1998 | Nakamura |
| 5,916,019 | A | * | 6/1999 | Whittlesey .................. 452/32 |
| 6,050,888 | A | * | 4/2000 | Nakamura et al. ........... 452/47 |
| 6,056,635 | A | * | 5/2000 | Vermeer et al. ............. 452/30 |
| 6,066,035 | A | | 5/2000 | Hergott |
| 6,146,261 | A | * | 11/2000 | Bienert et al. ............... 452/22 |

* cited by examiner

Primary Examiner—Thomas Price
(74) Attorney, Agent, or Firm—Kanesaka & Takeuchi

(57) ABSTRACT

A method and an apparatus (1) for manufacturing natural intestine sausages includes a stuffing tube (4), an intestine pushing member (6), an intestine-pushing-member driving device (7), an intestine receiving member (9), a braking member (10), a transporting device (11), a detecting device (13) for detecting the position of the intestine pushing member (6) with respect to the intestine receiving member (9), and a controlling device (15) for stopping the operation of a material supplying device (3). A distal end (4A) of the stuffing tube (4) is positioned in such a manner as to project from the braking member (10) toward the transporting device (11).

17 Claims, 9 Drawing Sheets

PRODUCTION METHOD OF NATURAL INTESTINE SAUSAGE AND DEVICE THEREFOR

TECHNICAL FIELD

The present invention relates to a method and an apparatus for manufacturing natural intestine sausages, which are used in the technical field of manufacturing sausages.

BACKGROUND ART

With conventional apparatuses for manufacturing natural intestine sausages, if an attempt is made to stuff a material up to a rear end portion of a natural intestine casing, the material is discharged from a nozzle by following the material which caused the rear end portion to be dislocated from the nozzle. This material is scattered without being stuffed into the rear end portion of the natural intestine casing, and not only has this been undesirable in sanitation, but a waste of the material has resulted. Thus, unless the material is stuffed up to the rear end portion for preventing the scattering of the material, the waste of the natural intestine casing occurs.

The present invention has been devised in view of the above-described aspects, and its first object is to provide a method and an apparatus for manufacturing natural intestine sausages, which make it possible to stuff the material up to the rear end portion of the natural intestine casing by establishing synchronization between the movement of the natural intestine casing and the stopping of the supplying of the material. A second object of the invention is to provide a method and an apparatus for manufacturing natural intestine sausages, which make it possible to generate with high accuracy a signal for stopping the supplying of the material into the natural intestine casing. A third object of the invention is to provide a method and an apparatus for manufacturing natural intestine sausages, which make it possible to generate with high accuracy a signal for stopping the supplying of the material into the natural intestine casing, following the advancing of the rear end portion of the natural intestine casing by a simple method.

DISCLOSURE OF THE INVENTION

To these ends, in accordance with the invention, there is provided a method for manufacturing natural intestine sausages, comprising the steps of: fitting a natural intestine casing over a stuffing tube in a state in which the natural intestine casing is divided into a shirred portion and a straight portion; causing an intestine pushing member to push and advance the shirred portion toward an intestine receiving member; pinching the shirred portion by and between the intestine pushing member and the intestine receiving member; detecting that the intestine pushing member has reached a predetermined position; pulling the natural intestine casing on the stuffing tube projecting from the intestine receiving member and sliding the natural intestine casing on the stuffing tube by transporting the natural intestine casing, stuffed with a material, by transporting means for a predetermined time after the detection; and stopping the discharging of the material into the natural intestine casing after the lapse of a predetermined time.

In accordance with the invention, there is provided an apparatus for manufacturing natural intestine sausages including a stuffing tube having a distal end and adapted to stuff a material into a natural intestine casing, material supplying means for supplying the material into the stuffing tube, and transporting means disposed forwardly of the distal end of the stuffing tube and adapted to transport the natural intestine casing, stuffed with the material, in a direction away from the distal end, comprising: an intestine pushing member for pushing a rear end portion of the stuffing tube on the stuffing tube; intestine-pushing-member driving means for pushing and advancing the intestine pushing member toward the distal end of the stuffing tube; an intestine receiving member having a hole portion through which the distal end is passed so that the distal end of the stuffing tube is located in such a manner as to project on a transporting-means side, the intestine receiving member being adapted to receive the natural intestine casing being pushed by the intestine pushing member; detecting means for detecting a position of the intestine pushing member and generating a detection signal; and controlling means for stopping the operation of the material supplying means in response to the detection signal.

In accordance with the method and the apparatus according to the above-described aspects of the invention, the movement of the natural intestine casing on the stuffing tube subsequent to the generation of the detection signal is made to follow the movement of the stuffed natural intestine casing which is transported by the transporting means, and the shirred portion of the natural intestine casing undergoes a change in form into a completely straight portion. Accordingly, it is possible to establish synchronization between the arrival of the rear end portion of the natural intestine casing at the distal end of the stuffing tube and the stopping of the supplying of the material into the stuffing tube by the material supplying means in response to the detection signal.

BEST MODE FOR CARRYING OUT THE INVENTION

Referring now to the accompanying drawings illustrating preferred embodiments of the invention, a more detailed description will be given of the embodiments of the invention. It should be noted that the invention is not limited to these embodiments.

Figure 1:
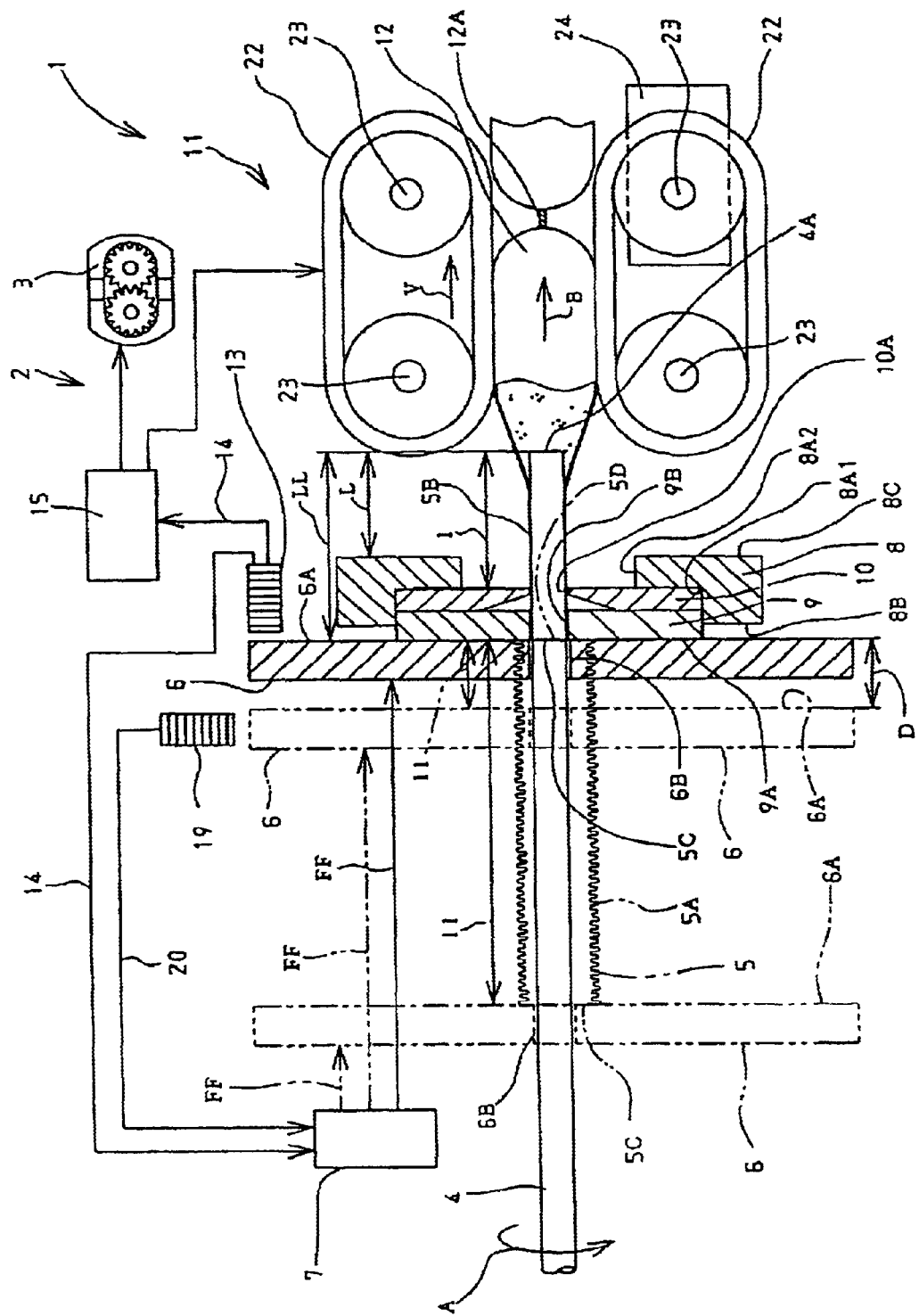
FIG. 1 is an explanatory front elevational view of a preferred embodiment of the invention.

In FIG. 1, reference numeral 1 denotes an apparatus for manufacturing natural intestine sausages; 2, a device for stopping the charging of a sausage material constituted by ground meat or a meat emulsion (hereafter referred to as the material) into a natural intestine casing 5; 3, a material supplying means for supplying the material into a stuffing tube 4; 4A, a distal end of the stuffing tube 4 for discharging the material; 4, the stuffing tube adapted to rotate in the direction of arrow A while supporting the natural intestine casing 5 and stuffing the material into it; 5, the natural intestine casing including a shirred portion 5A, a straight portion 5B, a rear end portion 5C, and a front end portion 5D of the shirred portion 5A; and 6, an intestine pushing member having an intestine pushing surface 6A for pushing the rear end portion 5C of the natural intestine casing 5 and a hole 6B through which the stuffing tube 4 is passed. Reference numeral 7 denotes an intestine-pushing-member driving means for pushing and advancing the intestine pushing member 6 toward the distal end 4A of the stuffing tube 4, and numeral 8 denotes an intestine-receiving-member attaching member constituted by a rotating pulley and adapted to rotate in the direction of arrow A in synchronism with the stuffing tube 4. The intestine-receiving-member attaching member 8 has an end face 8B facing the intestine pushing member 6 side, an end face 8C facing the transporting means 11 side, and hole portions 8A1 and 8A2 which are respectively formed in such a manner as to penetrate both end faces 8B and 8C, an intestine receiving member 9 being fitted in the hole portion 8A1. The intestine receiving member 9 has an intestine receiving surface 9A for receiving the shirred portion 5A pushed by the intestine pushing member 6 and a hole portion 9B through which the straight portion 5B is passed; 10, a braking member which is provided with a hole portion 10A having a portion engaging an outer surface of the straight portion 5B and is adapted to brake the movement of the straight portion 5B in the direction toward the distal end 4A; 11, a transporting means including a pair of wrapping connectors 22 which travel at a transporting speed V in the direction of arrow B, rotating shafts 23 for driving the wrapping connectors 22, and a motor 24 for driving the rotating shafts 23. The transporting means 11 pinches a stuffed natural intestine casing 12, which has been stuffed with the material, from its outer sides and transports it at a predetermined speed. Reference numeral 13 denotes a detecting means for detecting the mutual contact between the intestine pushing surface 6A and the intestine receiving surface 9A, i.e., for detecting the position of the intestine pushing surface 6A with respect to the intestine receiving surface 9A, and for transmitting a detection signal 14 to a controlling means 15 and the intestine-pushing-member driving means 7. The detecting means 13 has a proximity sensor. The controlling means 15 is used to stop the operation of the material supplying means 3 based on the detection signal 14 and change the transporting speed V of the transporting means 11, as required. Reference numeral 19 denotes a second detecting means for detecting that the intestine pushing surface 6A and the intestine receiving surface 9A have faced each other with a predetermined interval D therebetween, and for transmitting a second detection signal 20 to the intestine-pushing-member driving means 7, and the second detecting means 19 has a proximity sensor.

The stuffing tube 4 is disposed with respect to the intestine-receiving-member attaching member 8 such that the distal end 4A of the stuffing tube 4 is positioned in such a manner as to project by the length L toward the transporting means 11 side from the end face 8C of the intestine-receiving-member attaching member 8 facing the transporting means 11 side.

The intestine-receiving-member attaching member 8 may not necessarily be adapted to rotate. It suffices if the intestine receiving member 9 and the braking member 10 which are fitted in the hole portion 8A1 are attached to the intestine-receiving-member attaching member 8, which is in a stationary state, in such a manner as to be rotatable in the direction of arrow A. Furthermore, the intestine receiving member 9 and the braking member 10 may be unrotatably attached to the intestine-receiving-member attaching member 8 which is in an unrotatable stationary state.

The intestine receiving member 9 is provided by being fitted in the hole portion 8A1 so that the intestine receiving surface 9A is positioned in such a manner as to project from the end face 8B toward the detecting means 19 side, i.e., so that the intestine receiving surface 9A is located outside the hole portion 8A1. The braking member 10 is positioned closer to the distal end 4A side than the intestine receiving surface 9A in the state in which the braking member 10 is in contact with the intestine receiving member 9, and the distal end 4A is positioned in such a manner as to project by the length l from the braking member 10 and by the length LL from the intestine receiving surface 9A. The lengths l and LL can be set changeably depending on the ease of slippage of the natural intestine casing 5 used on the stuffing tube 4.

The intestine-pushing-member driving means 7 is a means for generating a pushing and advancing force FF with respect to the intestine pushing member 6. For example, the intestine-pushing-member driving means 7 may be such as a means using an air cylinder with a rod, a means using a rodless air cylinder, a means for blowing air, a means using a spring force, a means using a magnetic force, a means using an elastic member such as rubber, or other means including, for example, a manual force, and each of these means may be used, as required.

It is preferred that the intestine receiving member 9 have such rigidity that it is not deformed by being pressed by the intestine pushing member 6, and have such a shape and be formed of such a material as to prevent the front end portion 5D from entering the interior of the hole portion 9B and easily allow the shirred portion 5A to undergo a change in form into the straight portion 5B. For example, the intestine receiving member 9 is a tubular member formed of a metal, a synthetic resin, or rubber, and its intestine receiving surface 9A has a flat shape, while its hole portion 9B has an inner peripheral portion opposing the outer peripheral surface of the stuffing tube 4 with a small gap therebetween.

The braking member 10 has such a shape and is formed of such a material as to brake the movement of the straight portion 5B in the direction toward the distal end 4A and permit the prevention of the entry of air into the straight portion 5B. For example, the braking member 10 is a resilient hollow cylindrical member formed of rubber, and is provided with the hole portion 10A having an inner peripheral portion which comes into close contact with the outer peripheral surface of the stuffing tube 4.

The apparatus 1 operates as follows. The stuffed natural intestine casing 12 is transported by the transporting means 11 at a predetermined speed, the straight portion 5B on the stuffing tube 4 is pulled out from the distal end 4A, and the shirred portion 5A, while passing through the hole portion 9B and the hole portion 10A by being pulled by the straight portion 5B, changes into the straight portion 5B, and moves on the stuffing tube 4 toward the distal end 4A, so that the length l1 of the shirred portion 5A decreases gradually. The straight portion 5B undergoes a reduction of its inside diameter by being pulled, and its inner surface is substantially brought into close contact with the outer surface of the stuffing tube 4.

The intestine-pushing-member driving means 7 causes the pushing and advancing force FF to be intermittently applied to the intestine pushing member 6, and the intestine pushing member 6 moves toward the intestine receiving surface 9A while pushing the shirred portion 5A against the intestine receiving surface 9A. When the intestine pushing surface 6A is pushed and advanced to the position opposing the intestine receiving surface 9A with the predetermined interval D, the second detecting means 19 detects the intestine pushing member 6, and transmits the second detection signal 20 to the intestine-pushing-member driving means 7. Upon receiving the second detection signal 20, the intestine-pushing-member driving means 7 changes the manner of applying the pushing and advancing force FF with respect to the intestine pushing member 6 so as to push and advance the intestine pushing member 6 by continuously applying the pushing and advancing force FF to the intestine pushing member 6.

Upon receiving the continuous pushing and advancing force FF, the intestine pushing member 6 advances toward the intestine receiving surface 9A while pushing the rear end portion 5C. When all the shirred portion 5A which was placed between the intestine pushing surface 6A and the intestine receiving surface 9A is pulled out from the hole portion 9B, the intestine pushing surface 6A abuts against the intestine receiving surface 9A, so that the intestine pushing surface 6A and the intestine receiving surface 9A are brought into contact with each other. When the intestine pushing surface 6A reaches the position of abutment against the intestine receiving surface 9A, the detecting means 13 detects the intestine pushing member 6. Namely, the detecting means 13 detects that the intestine pushing surface 6A and the intestine receiving surface 9A have contacted each other, and transmits the detection signal 14 to the controlling means 15.

In accordance with this apparatus 1, since the manner of pushing and advancing the natural intestine casing 5 is changed even before approaching the completion of stuffing, it is possible to generate with higher accuracy the signal 14 for stopping the supplying of the material into the natural intestine casing 5.

The rear end portion 5C located at the intestine receiving surface 9A at the time of the generation of the detection signal 14 is pulled by the stuffed natural intestine casing 12 being pinched and transported by the wrapping connectors 22, and thus slides on the stuffing tube 4 at a predetermined speed. At the point of time when the rear end portion 5C has moved to the distal end 4A, the operation of the material supplying means 3 is stopped by the controlling means 15 which received the detection signal 14, so that the discharging of the material from the distal end 4A is stopped. The controlling means 15, after receiving the detection signal 14, stops after a predetermined time lag the supplying of the material by the material supplying means 3, as necessary.

The controlling means 15 may be provided with a means for changing the transporting speed V of the transporting means 11 on the basis of the detection signal 14. As the means for changing the transporting speed V of the transporting means 11, it is possible to use a device for changing the number of revolutions of a shaft 23. This device is, for example, a clutch brake attached to the shaft 23, a number-of-revolution controlling device (an inverter, a driver for a servo motor) of the motor 24, or an electromagnetic switch for starting and stopping the motor 24. If the controlling means 15 upon receiving the detection signal 14 is arranged to decelerate the transporting speed V of the transporting means 11, the lengths l and LL can be shortened appropriately, so that this arrangement is suitable for use of the natural intestine casing 5 of the type which is difficult to slide on the stuffing tube 4.

Since this apparatus 1 is so arranged that the pushing and advancing force FF is applied continuously after the pushing and advancing force FF is applied intermittently, the excessive pushing of the natural intestine casing 5 is difficult to occur, and high detection accuracy can be realized. Further, since the intestine receiving surface 9A is positioned in such a manner as to project from the end face 8B toward the detecting means 19 side, the material attached to the intestine receiving surface 9A can be easily removed, thereby facilitating the maintenance of high detection accuracy. Even if the intestine receiving surface 9A is positioned flush with the end face 8B, a similar advantage can be obtained.

Until the material supplying means 3 stops the supply of the material after the generation of the detection signal 14, there is a time lag due to signal processing. In this embodiment, however, since the rear end portion 5C moves at a predetermined speed on the stuffing tube 4 having portions with the length l and the length LL, it is possible to establish synchronization between the arrival of the rear end portion 5C at the distal end 4A and the stopping of the material charging. Since the natural intestine casing 5 which moves after the generation of the detection signal 14 does not have the shirred portion 5A, synchronization between the arrival of the rear end portion 5C at the distal end 4A and the stopping of the material charging can be controlled with higher accuracy. Further, since the rear end portion 5C of the intestine slides on the outer peripheral surface of the stuffing tube 4, the rear end portion 5C assumes the form of being completely stretched out, synchronization with higher accuracy can be attained.

In accordance with this apparatus 1, even if the shirred portion 5A including the rear end portion 5C of the natural intestine casing 5 having an extremely small thickness of, e.g., 0.03 mm, is present between the intestine pushing surface 6A and the intestine receiving surface 9A, these two surfaces 6A and 9A cannot come into contact with each other. Only when the shirred portion 5A including the rear end portion 5C has been pulled out from the gap between these two surfaces 6A and 9A, can these two surfaces come into contact with each other. Accordingly, this apparatus is suitable for reliably detecting the presence or absence of the rear end portion 5C of the natural intestine casing 5 which is extremely thin.

Figure 2:
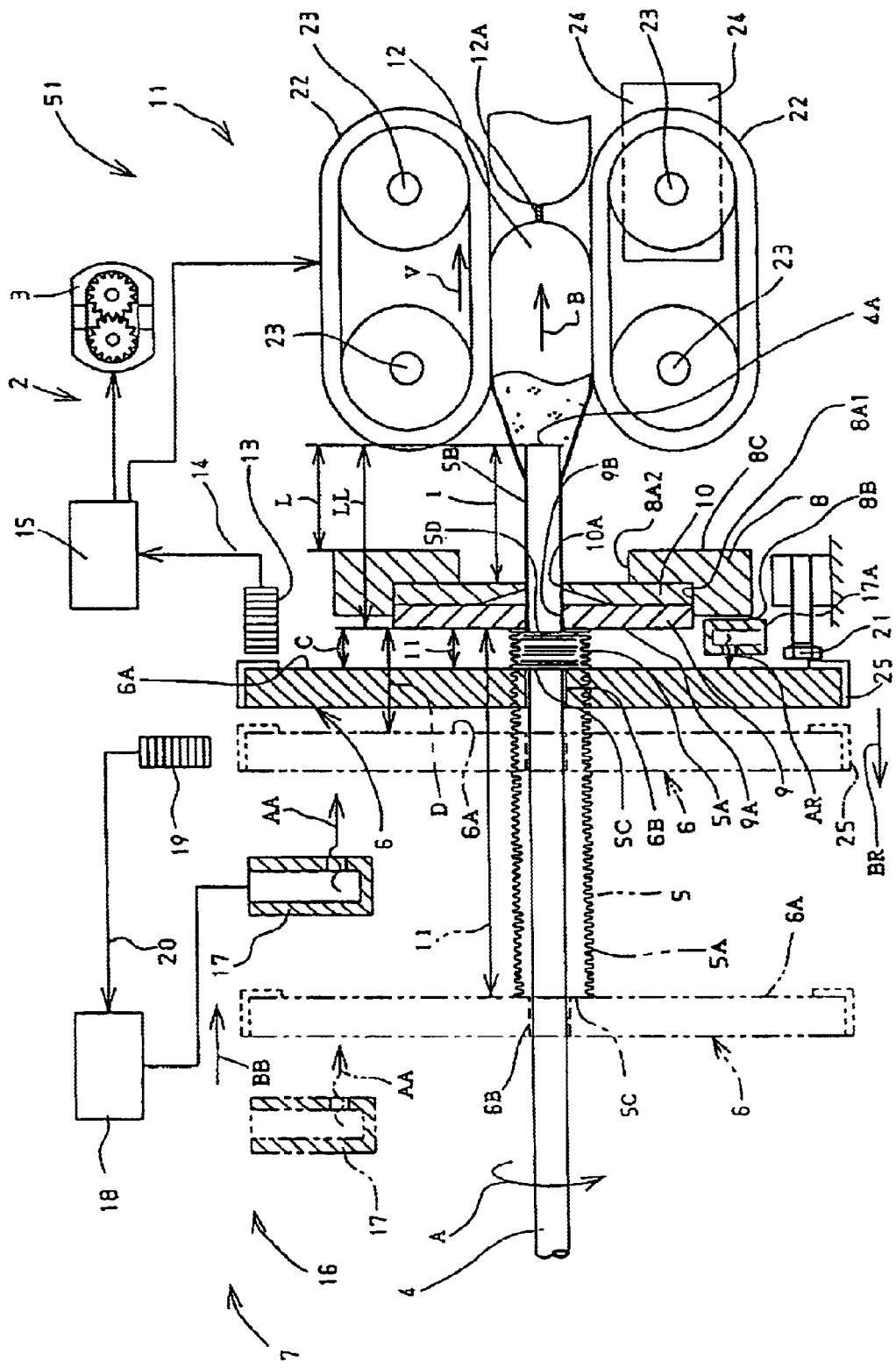
FIG. 2 is an explanatory front elevational view of another preferred embodiment of the invention.
Figure 3:
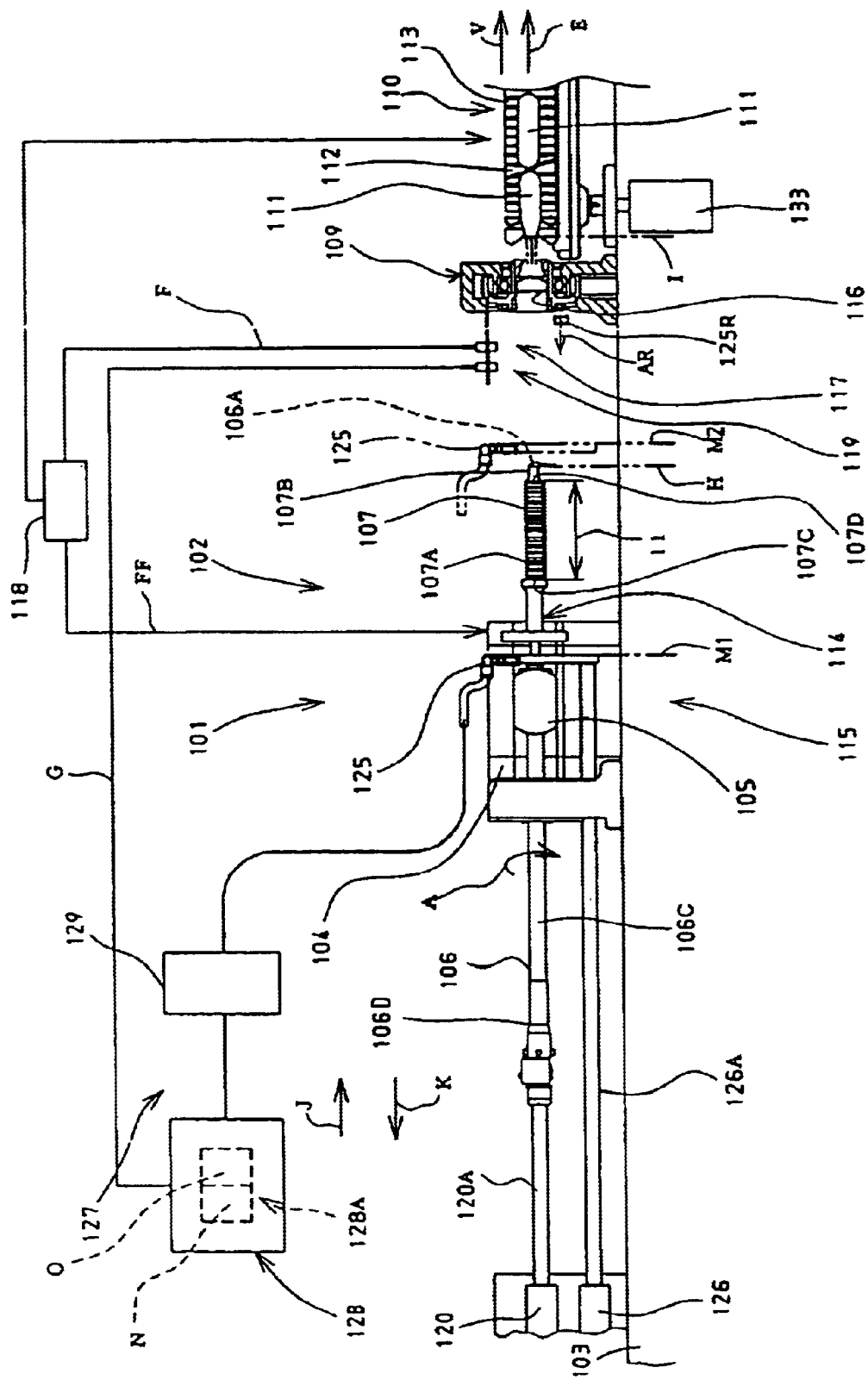
FIG. 3 is an explanatory front elevational view of still another preferred embodiment of the invention.

With the apparatus 1 shown in FIG. 1, the stopping of the supplying of the material is effected on the basis of the detection signal 14 generated as the detecting means 13 detects the mutual contact between the intestine pushing surface 6A and intestine receiving surface 9A. However, as in the case of an apparatus 51 in accordance with another embodiment of the invention shown in FIG. 2, the stopping of the supplying of the material can be also effected on the basis of the detection signal 14 generated as the detecting means 13 detects a predetermined interval C determined by the intestine pushing surface 6A of the intestine pushing member 6 and the intestine receiving surface 9A of the intestine receiving member 9.

The apparatus 51 differs from the apparatus 1 in that the detecting means 13 detects the predetermined interval C, i.e., detects the position of the intestine pushing surface 6A with respect to the intestine receiving surface 9A, and generates the detection signal 14 for stopping the supplying of the material.

The intestine pushing member 6 of this apparatus 51 is a hollow cylindrical member formed of a resin, and has an annular member to be detected 25 which is fitted around its outer periphery and is formed of a metal. The intestine-pushing-member driving means 7 has an air blowing means 16 for blowing air AA onto the intestine pushing member 6, and the air blowing means 16 has an air nozzle 17 and an air-blowing-mode changing means 18 for changing the mode of blowing air onto the intestine pushing member 6 on the basis of the second detection signal 20 of the second detecting means 19.

The detecting means 13 has a proximity sensor for detecting the annular member to be detected 25, detects the predetermined interval C determined by the intestine pushing surface 6A and the intestine receiving surface 9A, and transmits the detection signal 14 to the controlling means 15 and the intestine-pushing-member driving means 7. The predetermined interval C can be set changeably by taking into account the magnitudes of the length l and the transporting speed V.

The second detecting means 19 is a detecting means for detecting that the intestine pushing surface 6A and the intestine receiving surface 9A have faced each other with the predetermined interval D, and for transmitting the second detection signal 20 to the intestine-pushing-member driving means 7. The second detecting means 19 has a proximity sensor for detecting the annular member to be detected 25.

The apparatus 51 operates as follows. The air blowing means 16 blows the air AA intermittently at predetermined periods toward the intestine pushing member 6 from the air nozzle 17 which moves in the direction of arrow BB. The air nozzle 17 moves at a predetermined speed correlated to the transporting speed V of the transporting means. In the air-blowing process, the air AA pushes and advances the intestine pushing member 6 in the direction toward the distal end 4A. In the process during which air is not blown, the intestine pushing member 6 cancels the pushing against the shirred portion 5A. Such intermittent pushing prevents excessive compression which can occur in the shirred portion 5A. The proximity sensor of the second detecting means 19 detects the annular member to be detected 25 which has been pushed and advanced up to the position for determining the predetermined interval D, and transmits the second detection signal 20 to the air-blowing-mode changing means 18. The air-blowing-mode changing means 18, upon receiving the second detection signal 20, changes the mode of blowing air, i.e., the manner of blowing air, so that the air AA will be blown continuously from the air nozzle 17. Since the air nozzle 17 is moved from the stuffing starting position in the direction of BB to blow air, the accuracy of pneumatic action on the intestine pushing member 6 improves. It should be noted, however, that the air nozzle 17 may not be moved in the direction of BB, and may be disposed in such a manner as to be fixed at the stuffing starting position.

While receiving the air AA being continuously blown out from the air nozzle 17 at a standstill in the illustrated position, the intestine pushing surface 6A of the intestine pushing member 6 moves to the position of the predetermined interval C which is determined by the intestine pushing surface 6A and the intestine receiving surface 9A. The proximity sensor of the detecting means 13 detects the annular member to be detected 25 of the intestine pushing member 6 which reached that position, and transmits the detection signal 14 to the controlling means 15.

Reference numeral 21 denotes a predetermined-interval setting member for setting the predetermined interval C, and the arrangement provided is such that as the intestine pushing member 6 abuts against the predetermined-interval setting member 21, the intestine pushing surface 6A faces the intestine receiving surface 9A with the predetermined interval C. Although, in this embodiment, an adjustment screw capable of adjusting and setting with precision the magnitude of the predetermined interval C constitutes the predetermined-interval setting member 21, the present invention is not limited to the same, and a shim member having the same thickness as the predetermined interval may be used, for example. Even if this predetermined-interval setting member 21 is not provided, the detecting means 13 is able to detect the intestine pushing member 6 which reached the position where it faces the intestine receiving surface 9A with the predetermined interval C.

When the end portion 5C located at the intestine pushing surface 6A at the time of generation of the detection signal 14 reaches the distal end 4A, the discharging of the material from the distal end 4A is stopped at this point of time of arrival in the same way as with the apparatus 1. Thus, in this embodiment, the shirred portion 5A of the natural intestine casing 5 undergoes a change in form into a completely straight portion 5B by the intestine receiving member 9, and the rear end portion 5C moves while sliding on the stuffing tube 4 having the lengths l and LL at a predetermined speed, so that synchronization can be established between the arrival of the rear end portion 5C at the distal end 4A and the stopping of the material charging.

With this apparatus 51 as well, since the stuffing tube 4 has the length l and the length LL, the magnitude of the predetermined interval C can be set to be smaller. This apparatus 51 in which the predetermined interval C is set to be small is able to shorten the length of the natural intestine casing 5 located in the predetermined interval C, so that the detection accuracy is high.

With this apparatus 51, since the mechanism which operates for pushing the natural intestine casing 5 is constituted by the intestine pushing member 6 alone, the variation of the pushing and advancing force acting on the natural intestine casing 5 is small. The mechanism for pushing the natural intestine casing 5 is extremely simplified. Since the mechanism is based on the intermittent blowing of air, the instantaneous pushing and advancing of the natural intestine casing becomes possible. Since the annular member to be detected 25 is provided, the intestine pushing member 6, while rotating in the direction of arrow A, can be detected by the detecting means 13, thereby making it possible to prevent damage to the rear end portion 5C which can occur by the pressing by the intestine pushing member 6.

The above-described intestine receiving member 9 can be substituted by the intestine receiving member 9 having such rigidity that the intestine receiving surface 9A can be deformed by being pressed by the intestine pushing member 6. This substituted intestine receiving member 9 is a tubular member formed of rubber and having resiliency similar to that of the braking member 10, and is provided with the hole portion 9B having an inner peripheral portion coming into close contact with the outer peripheral surface of the stuffing tube 4. If the intestine receiving member 9 having such construction is used, the braking member 10 can be omitted.

The apparatus 51 may be provided with an air nozzle 17A. In the process in which the air nozzle 17 is not blowing the air AA, the air nozzle 17A blows air AR onto the intestine pushing member 6 to move the intestine pushing member 6 in the direction of arrow BR. This makes it possible to move the intestine pushing surface 6A away from the rear end portion 5C.

An apparatus 101 for manufacturing natural intestine sausages in accordance with still another embodiment shown in FIGS. 3 to 8 has a device 102 for stopping the stuffing of the material into the natural intestine casing.

The apparatus 101 for manufacturing natural intestine sausages is comprised of a base 103; a material supplying means 104 constituted by a gear pump for supplying to a stuffing tube 106 the material to be stuffed into a natural intestine casing 107; a stuffing tube bearing 105 for reciprocatably supporting the stuffing tube 106; the stuffing tube 106 including a distal end 106A for stuffing the material from the material supplying means 104 into the natural intestine casing 107, a small-diameter portion 106B over which the natural intestine casing 107 is fitted, and a large-diameter portion 106C supported by the stuffing tube bearing 105; the natural intestine casing 107 being fitted over the stuffing tube 106 and divided into a shirred portion 107A and a straight portion 107B; a braking member 108 having a hole portion 108A through which the distal end 106A of the stuffing tube 106 is passed and which has a portion for engaging the natural intestine casing 107 on the stuffing tube 106; a braking-member rotatively driving means 109 for rotatively driving the braking member 108; and a transporting means 110 adapted to transport a stuffed natural intestine casing 111 and including a pair of wrapping connectors 113 which are disposed adjacent to the braking-member rotatively driving means 109 and to which constricting members 112 for constricting the natural intestine casing 111 stuffed with the sausage material are fixed at predetermined intervals, a motor 133 for driving the wrapping connectors 113, two pairs of rotatively driving members 134 around which the wrapping connectors 113 are respectively wound, and two pairs of shafts 135 to which the rotatively driving members 134 are secured.

The device 102 for stopping the stuffing of the material into the natural intestine casing includes an intestine pushing member 114 for pushing a rear end portion 107C of the natural intestine casing 107; an air blowing means 115 for blowing the air AA onto the intestine pushing member 114 so as to push the intestine pushing member 114; an intestine receiving member 116 for receiving a front end portion 107D of the shirred portion 107A of the natural intestine casing 107 being pushed by the intestine pushing member 114; a detecting means 117 for generating a detection signal F upon detecting the intestine pushing member 114 which has been pushed and advanced by the air blowing means 115; and a controlling means 118 for transmitting a signal FF for stopping the supplying of the material by the material supplying means 104 on the basis of the detection signal F from the detecting means 117. The aforementioned air blowing means 115 constitutes the intestine-pushing-member driving means.

The above-described device 102 is further provided with a second detecting means 119 for generating a detection signal G upon detecting the intestine pushing member 114 which has been pushed and advanced by the air blowing means 115.

Figure 6:
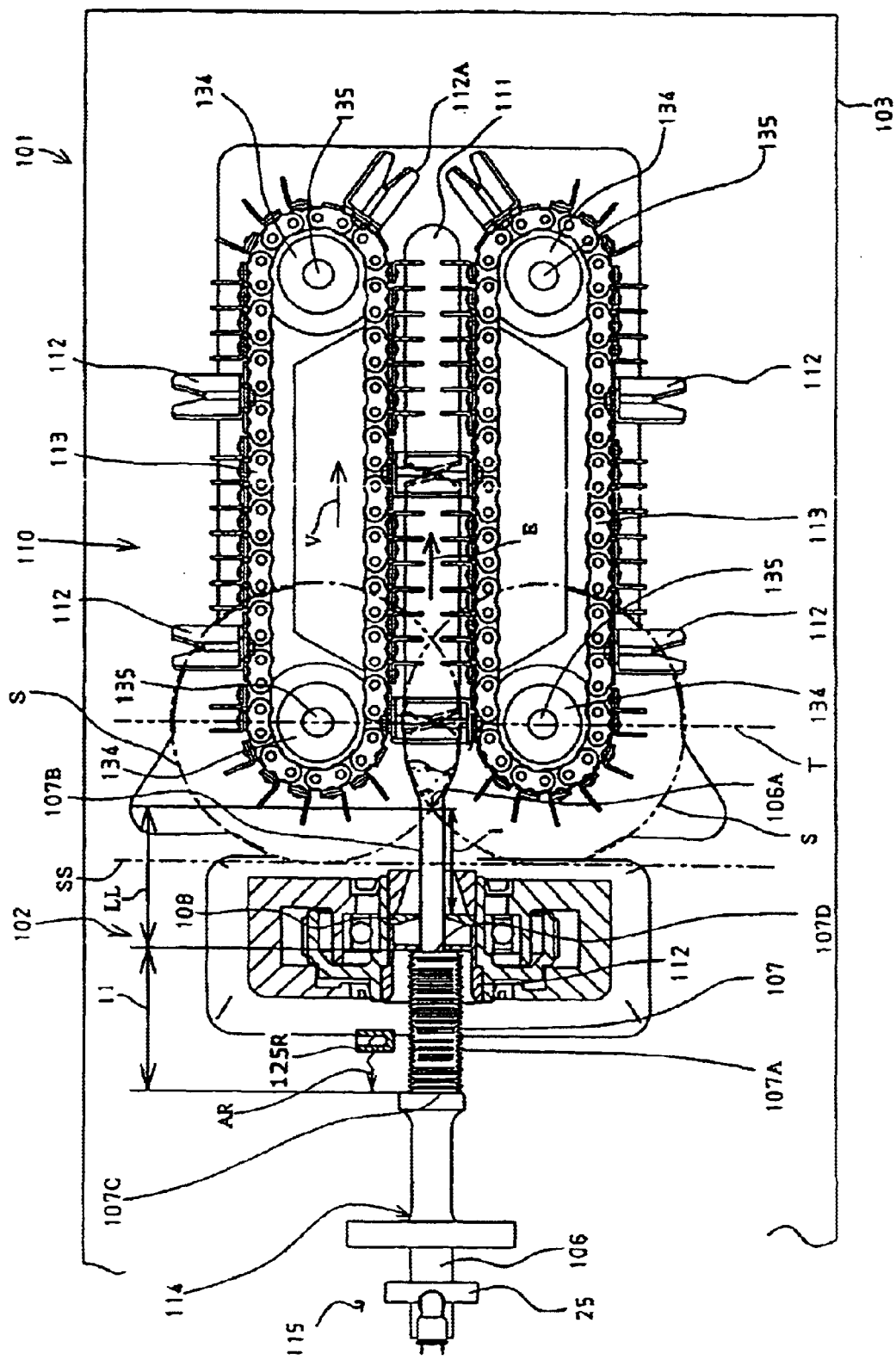
FIG. 6 is a partly enlarged explanatory plan view of the embodiment shown in FIG. 3.

The stuffing tube 106 has a rear portion 106D connected to a rod 120A of a reciprocating air cylinder 120, and moves reciprocatingly in the directions of arrow J and arrow K. As shown in FIG. 6, the distal end 106A of the stuffing tube 106 located at a forward end position I is positioned between a line T passing through the rotational centers of the shafts 135 of the transporting means 110 and a common tangential line SS tangential to a pair of locus circles S of tips 112A of the constricting members 112 rotating about the respective shafts 135. The distal end 106A is located in such a manner as to project by the length l from the braking member 108.

The braking-member rotatively driving means 109 is fixedly provided on the base 103 and includes a housing 121, an intestine-receiving-member attaching member 122 accommodated rotatably inside the housing 121, and a braking-member receiving member 123 for restricting the position of the braking member 108 in the direction of arrow J. The intestine-receiving-member attaching member 122 includes a boss portion 122C having an end face 122A and an end face 122B, as well as a hole portion 122D provided in the boss portion 122C. The hole portion 122D receives the stuffing tube 106 having the distal end 106A located at the position where the distal end 106A projects by the length L from the end face 122B toward the transporting means 110 side.

The intestine pushing member 114 includes a small-diameter portion 114B including an intestine pushing surface 114A formed by a flat surface, a large-diameter portion 114D including an air receiving surface 114C formed by a concave surface, a hollow cylindrical member 114-1 made of a resin material and having a hole portion 114E with an inner peripheral surface which is supported by the outer peripheral surface of the stuffing tube 106, and an annular member to be detected 114-2 which is made of a metal and is fitted over an outer periphery of the large-diameter portion 114D.

The air blowing means 115 includes an air nozzle 125 having an air outlet 125A, an air cylinder 126 having a rod 126A to which the air nozzle 125 is fixed so as to reciprocate the air nozzle 125 between a retracted end position Ml and a forward end position M2 of the air nozzle 125, and an air-blowing-mode changing means 127.

The air-blowing-mode changing means 127 is a means for changing the mode of blowing air onto the intestine pushing member 114, i.e., the manner (continuous blowing, intermittent blowing, the volume of air, air pressure, etc.) of blowing air onto the intestine pushing member 114, on the basis of the detection signal G from the second detecting means 119. The air-blowing-mode changing means 127 includes an air-blowing-mode controlling means 128 having a storage means 128A in which a plurality of air-blowing modes are stored, and an air controlling means 129 having a valve, a regulator, and other pneumatic equipment which are controlled by the air-blowing-mode controlling means 128. Stored in the storage means 128A are an air blowing mode N for pushing and advancing the intestine pushing member 114 toward the second detecting means 119, as well as an air blowing mode O for pushing and advancing the intestine pushing member 114 detected by the second detecting means toward the intestine receiving member 116.

The intestine receiving member 116 is a hollow cylindrical member having a hole portion 116A, a hole portion 116B, and an intestine receiving surface 116C formed by a flat surface defined by the hole portion 116A and the hole portion 116B, and is fitted in the hole portion 122D of the intestine-receiving-member attaching member 122. The hole portion 116A receives therein the small-diameter portion 114B of the intestine pushing member 114, while the hole portion 116B converts the shirred portion 107A into the straight portion 107B. The intestine receiving surface 116C is spaced apart by the length LL from the distal end 106A located at the forward end position I, and is located in the hole portion 122D.

Figure 4:
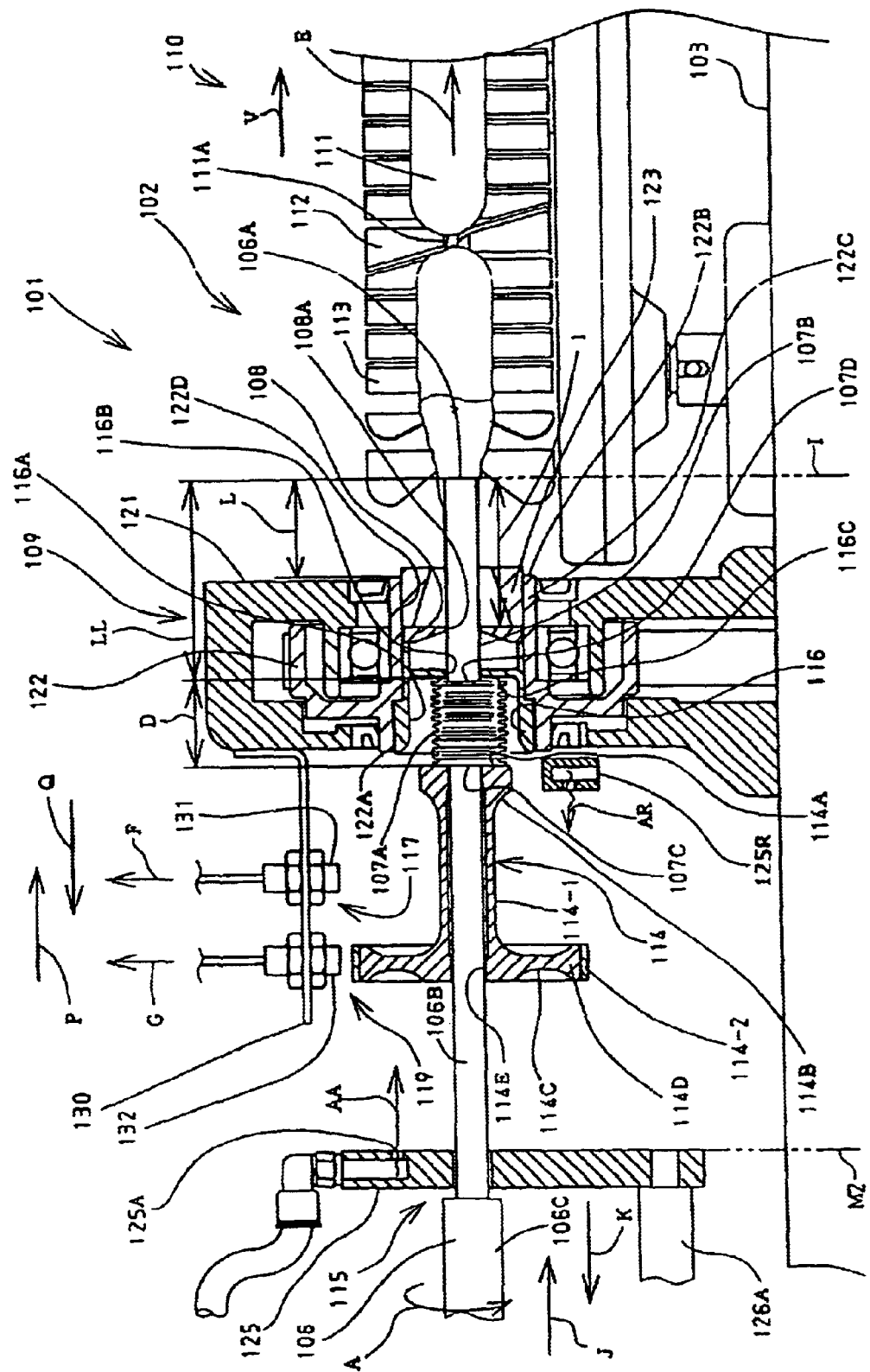
FIG. 4 is a partly enlarged front elevational view for explaining the structure and operation of the embodiment shown in FIG. 3.
Figure 5:
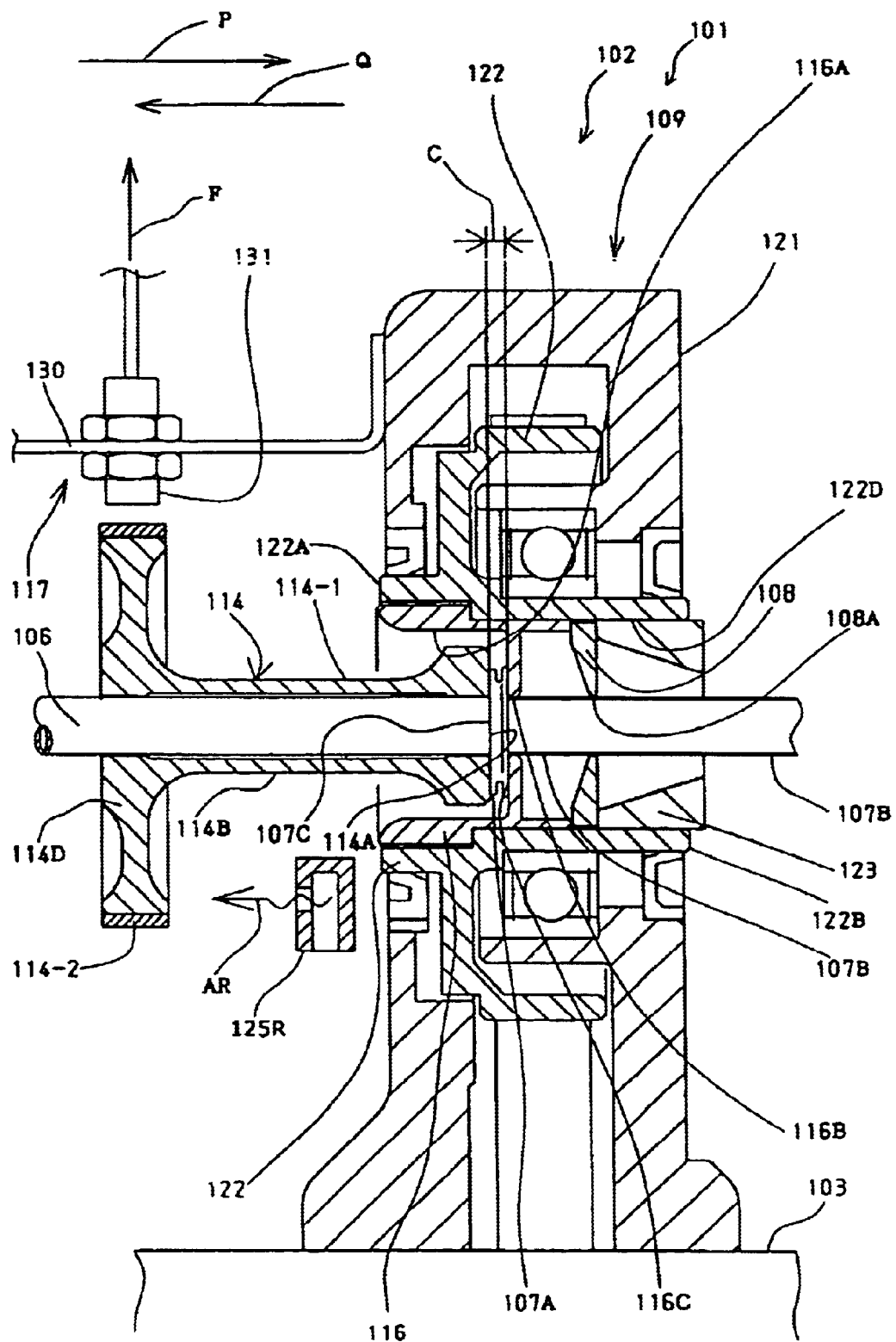
FIG. 5 is a partly enlarged front elevational view for explaining the structure and operation of the embodiment shown in FIG. 3.

The detecting means 117 detects that the intestine pushing surface 114A and the intestine receiving surface 116C have faced each other with the predetermined interval C, and transmits the detection signal F to the controlling means 118 and the air blowing means 115 (FIG. 5). The detecting means 117 has a proximity sensor 131 mounted on a bracket 130 secured to the housing 121, the proximity sensor 131 being adjustable in the directions of arrow P and arrow The second detecting means 119 has a proximity sensor 132 for detecting that the intestine pushing surface 114A and the intestine receiving surface 116C have faced each other with the predetermined interval D, and for transmitting the detection signal G to the air-blowing-mode controlling means 128 (FIG. 4). The proximity sensor 132 is mounted on the bracket 130 in such a manner as to be adjustable in the directions of arrow P and arrow Q.

The detecting means 117 and the second detecting means 119 are not limited to the proximity sensors, and are sufficient if they are respectively capable of detecting the positions of the intestine pushing member 114. For example, it is possible to use known sensors including photoelectric sensors, capacitive sensors, laser sensors, mechanical limit switches, or the like.

The apparatus 101 operates as follows. First, the natural intestine casing 107 is fitted over the stuffing tube 106 at a standstill at a retracted end position H. Next, the air cylinder 120 and the air cylinder 126 are respectively actuated to move the stuffing tube 106 toward the forward end position I, and the air nozzle 125 at the retracted end position M1 is moved to the forward end position M2. When the stuffing tube 106 reaches the forward end position I, the rotation of the stuffing tube 106 in the direction of A and the supply of the material by the material supplying means 104 are started.

When stuffing is started, the stuffed casing 111, in which a twisted portion 111A is formed at its portion where it is constricted by the constricting members 112 travelling at the transporting speed V in the direction of arrow E, pulls out the straight portion 107B from the distal end 106A. Consequently, the shirred portion 107A has its length l1 reduced gradually. Air is periodically blown out intermittently from the air outlet 125A onto the air receiving surface 114C in accordance with the air blowing mode N, so that the intestine pushing member 114 is pushed and advanced toward the intestine receiving member 116.

When the intestine pushing surface 114A reaches the position of the predetermined interval D determined by the intestine pushing surface 114A and the intestine receiving surface 116C, and faces the intestine receiving surface 116C with the predetermined interval D, the proximity sensor 132 detects the annular member to be detected 114-2 and generates the detection signal G (FIG. 4). Upon receiving the detection signal G, the air-blowing-mode controlling means 128 finishes the air blowing mode N, and at the same time selects the air blowing mode O for continuously blowing out air with a small air volume, a lower air pressure, and a low air speed, and effects a change into that mode. The intestine pushing member 114 upon receiving the air pressure based on the air blowing mode O continuously approaches the intestine receiving surface 116C.

When the intestine pushing surface 114A reaches the position of the predetermined interval C determined by the intestine pushing surface 114A and the intestine receiving surface 116C, and faces the intestine receiving surface 116C with the predetermined interval C, the proximity sensor 131 detects the annular member to be detected 114-2 and transmits the detection signal F to the controlling means 118 (FIG. 5), whereupon the controlling means 118 stops the supplying of the material by the material supplying means 104 when the rear end portion 107C reaches the distal end 106A. At the same time, the blowing out of air by the air blowing means 115 is stopped. Upon completion of the material charging into the natural intestine casing 107, the stuffing tube 106 retracts in the direction of arrow K to return to the retracted end position H so as to prepare for the ensuing fitting of the natural intestine casing 107 over the stuffing tube 106.

With this apparatus 101 as well, in the same way as the above-described apparatus 1, the controlling means 118, upon receiving the detection signal F, may control the speed of the motor 133 to change the transporting speed V of the transporting means 110, such that the rear end portion 107C reaches the distal end 106A at the point of time when the discharging of the material from the stuffing tube 106 has stopped.

Figure 7:
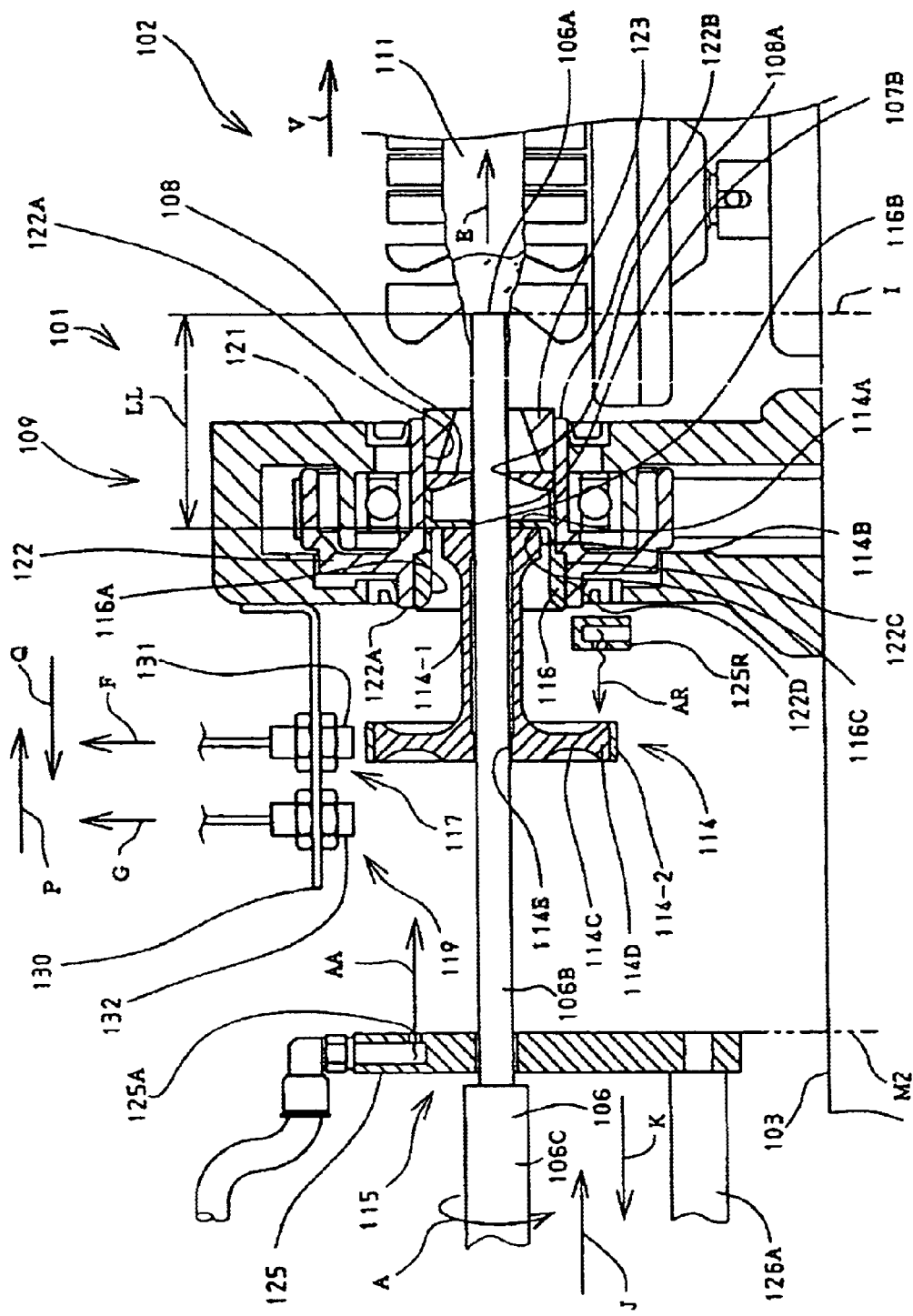
FIG. 7 is a partly enlarged front elevational view for explaining another method of detection in the embodiment shown in FIG. 3.

With this apparatus 101 as well, in the same way as the above-described apparatus 1, it is possible to provide the detecting means 117 for generating the detection signal F upon detecting that the intestine pushing surface 114A and the intestine receiving surface 116C have contacted each other, as shown in FIG. 7.

With the apparatus 101, since the distal end 106A extends up to the position between the line passing through the rotational centers of the shafts 135 and the tangential line SS (FIG. 6), it is possible to set a smaller predetermined interval C. In addition, since the intestine receiving surface 116C is located inside the hole portion 122A, and the length LL from the intestine receiving surface 116C to the distal end 106A can be shortened (FIG. 7), this arrangement is suitable for using the natural intestine casing 107 of the type which is difficult to slide on the stuffing tube 106.

Figure 8:
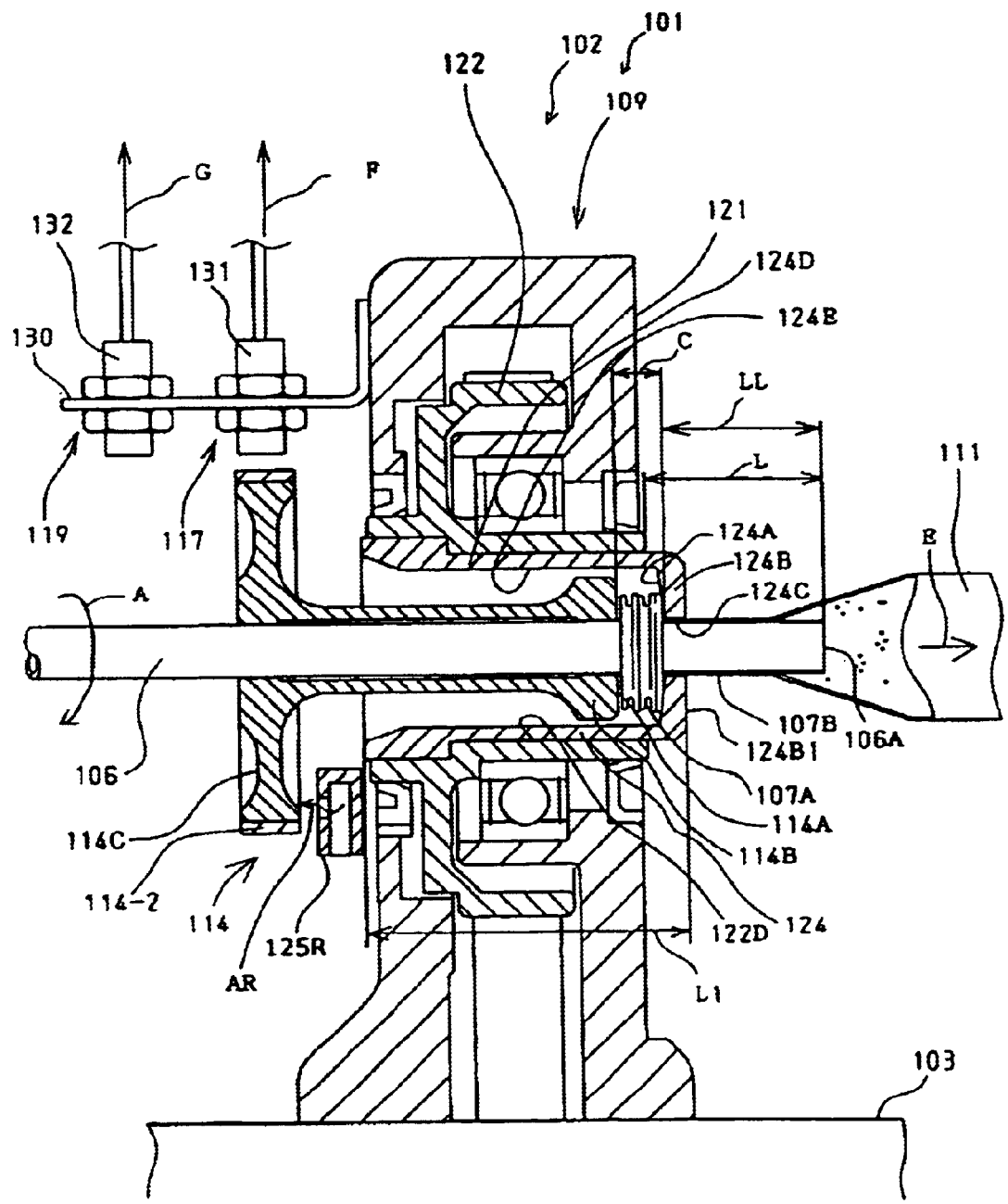
FIG. 8 is a partly enlarged front elevational view for explaining another example of an intestine receiving member in the embodiment shown in FIG. 3.

Although, in FIG. 4, illustration is given of the example in which the intestine receiving member 116, the braking member 108, and the braking-member receiving member 123 are used, FIG. 8 shows an example in which an intestine receiving member 124 formed of resilient rubber is used instead of these members. The intestine receiving member 124 is a hollow cylindrical member made of rubber and including an end portion 124B having an intestine receiving surface 124A, a small-diameter hole portion 124C provided in the end portion 124B and adapted to come into close contact with the outer peripheral surface of the stuffing tube 106, a body 124D having a length L1 and formed integrally with the end portion 124B, a large-diameter hole portion 124E provided in the body 124D, and an end face 124B1 of the end portion 124B. The intestine receiving member 124 is mounted by being fitted in the hole portion 122D of the intestine-receiving-member attaching member 122. The intestine receiving surface 124A is formed by a conical surface which is inclined toward the hole portion 124C, and the intestine receiving surface 124A determines the predetermined interval C in cooperation with the intestine pushing surface 114A. When the intestine pushing surface 114A reaches the position of the predetermined interval C, and faces the intestine receiving surface 124A in a state of being nonparallel with the intestine receiving surface 124A with the predetermined interval C, the proximity sensor 131 detects the annular member to be detected 114-2, and transmits the detection signal F to the controlling means 118.

In the intestine receiving member 124, the hole portion 124C changes the shirred portion 107A into the straight portion 107B, and brakes the movement of the straight portion 107B in the direction of arrow E. The end portion 124B of the intestine receiving member 124 also has the function of the aforementioned braking member 10 or 108.

The end portion 124B of the intestine receiving member 124 may have rigidity and resiliency equivalent to those of the aforementioned braking member 10 or 108. Even if the intestine receiving member 124 has such rigidity that deformation occurs in the intestine receiving surface 124A due to the action of the pressing force by the intestine pushing member 114, the proximity sensor 131 is capable of detecting the intestine pushing member 114, thereby making it possible to stop the supplying of the material.

Since the hole portion 124E of the intestine receiving member 124 is open from the intestine receiving surface 124A in the advancing direction of the intestine pushing member 114, the material attached to the inner peripheral surface of the hole portion 124E can be easily removed, with the result that a hindrance is unlikely to occur to the movement of the straight portion 107B on the stuffing tube 106 due to the attachment of the material thereto. Since the length LL from the intestine receiving surface 124A to the distal end 106A is shorter than the length LL using the intestine receiving member 116 shown in FIG. 7, this arrangement is suitable for use of the natural intestine casing 107 which is difficult to slide. Since the stuffing tube 106 has the large-diameter portion 106C, runout of rotation is difficult to occur. Since the intestine pushing member 114 which rotates about the stuffing tube 106 is also difficult to undergo runout in rotation, the accuracy of detection of the intestine pushing member 114 by the proximity sensor 131 is high.

In the same way as the above-described apparatus 51, this apparatus 101 may be also provided with an air nozzle 125R for blowing the air AR onto the intestine pushing member 114 in the process in which the air nozzle 125 is not blowing the air AA, so as to move the intestine pushing member 114 in the direction of arrow K.

This apparatus 101 may be so arranged that the air nozzle 125 does not reciprocate in the directions of arrows J and K. The air nozzle 125 may be fixed at, for example, the forward end position M2, and the air AA may be blown onto the intestine pushing member 114 at this position from the start of stuffing until the end of stuffing. In this case, the air nozzle 125 has its shape and its fixing structure such that the intestine pushing member 114 which moves together with the stuffing tube 106 moving toward the forward end position I does not collide against the air nozzle 125.

Figure 9:
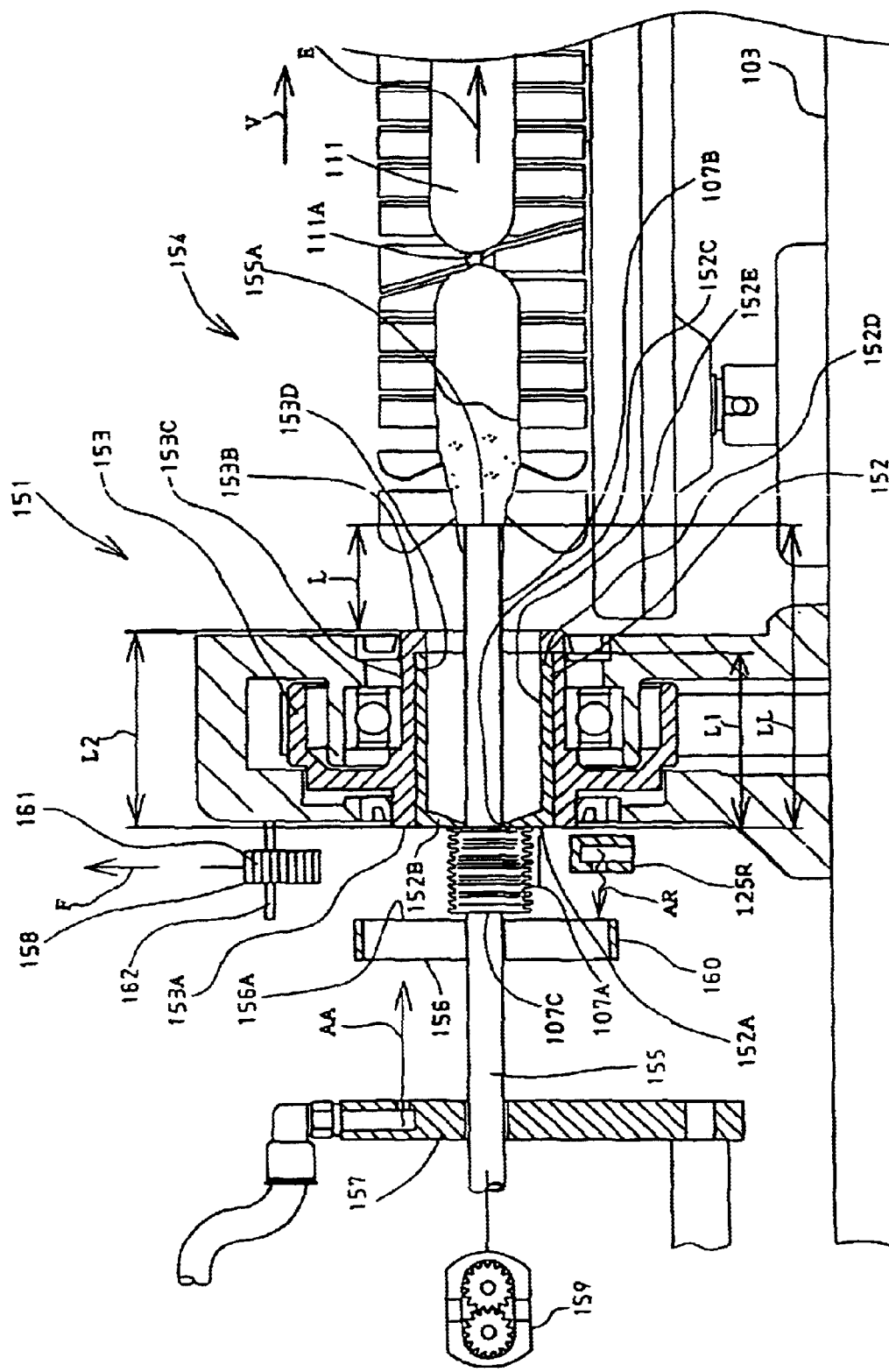
FIG. 9 is an explanatory front elevational view of a further preferred embodiment of the invention.

FIG. 9 shows an apparatus 151 which is not provided with the second detecting means as a further embodiment of the invention. The apparatus 151 is comprised of an intestine receiving member 152 which is a rubber-made hollow cylindrical member including an end portion 152B having an intestine receiving surface 152A, a small-diameter hole portion 152C provided in the end portion 152B, a body 152D having the length L1 and formed integrally with the end portion 152B, and a large-diameter hole portion 152E provided in the body 152D; an intestine-receiving-member attaching member 153 including a boss portion 153C having an end face 153A and an end face 153B, which together determine the length L2, and a hole portion 153D provided in the boss portion 153C; a transporting means 154; a stuffing tube 155 having a distal end 155A located at a position where it projects by the length L from the end face 153B toward the transporting means 154 side; an intestine pushing member 156 having an intestine pushing surface 156A; an intestine-pushing-member driving means 157 for pushing and advancing the intestine pushing member 156 toward the distal end 155A of the stuffing tube 155; a detecting means 158; and a material supplying means 159.

The intestine receiving member 152 is mounted by being fitted in the hole portion 153D such that the intestine receiving surface 152A is flush with the end face 153A. The hole portion 152C is designed to change the shirred portion 107A into the straight portion 107B, and has an inner peripheral portion for coming into contact with the outer peripheral surface of the straight portion 107B. The inner peripheral portion of the hole portion 152C faces the outer peripheral surface of the stuffing tube 155 in a state of close contact therewith or with a gap therewith. The intestine pushing member 156 has an annular member to be detected 160, and the detecting means 158 has a proximity sensor 161 for detecting the annular member to be detected 160. In the same way as the apparatus 1 and the apparatus 101, an arrangement may be provided such that the intestine receiving surface 152A is located in such a manner as to project toward the proximity sensor 161 side from the end face 153A. The end portion 152B of the intestine receiving member 152 also has the function of the aforementioned braking member 10 or 108.

With the apparatus 151, the proximity sensor 161 generates the detection signal F upon detecting the annular member to be detected 160 of the intestine pushing member 156 located at the position where the intestine pushing surface 156A and the intestine receiving surface 152A have contacted each other. The supplying of the material by the material supplying means 159 is stopped when the rear end portion 107C which was at the intestine receiving surface 152A at the time of the generation of the detection signal F moved by the length LL from the intestine receiving surface 152A and reached the distal end 155A.

The intestine receiving member 152 may have rigidity and resiliency of such a measure that deformation is caused in the intestine receiving surface 152A due to the action of the pressing force by the intestine pushing member 156. If the intestine pushing surface 156A and the intestine receiving surface 152A are in a state of virtual contact with each other, the detecting means 158 is able to detect that state. Alternatively, the detecting means 158 may detect a very small predetermined interval C, there by making it possible to stop the supplying of the material.

With the apparatus 151, since the length LL from the intestine receiving surface 152A to the distal end 155A, i.e., the moving length of the rear end portion 107C, is long, it is possible to cope with the stuffed natural intestine casing 111 which is transported at a faster transporting speed V. Since the intestine receiving surface 152A of the intestine receiving member 152 is not located inside the hole portion 153D of the intestine-receiving-member attaching member (rotating pulley) 153, the material attached to the intestine receiving surface 152A can be easily removed. Since the intestine receiving member 152 has the length L1 and is fitted in the hole portion 153D, the positional accuracy of the intestine receiving surface 152A is high. As for the hole portion 152D of the intestine receiving member 152, in the same way as the hole portion 124E of the aforementioned intestine receiving member 124, a hindrance is unlikely to occur to the movement of the straight portion 107B on the stuffing tube 155 due to the attachment of the material thereto.

With the above-described apparatuses 1, 51, 101, and 151, since the intestine pushing member 6, 114, or 156 for pushing the natural intestine casing 5 or 107 is directly detected, it is possible to accurately detect the position of the intestine pushing member 6, 114, or 156. Even if the intestine pushing members 6, 114, or 156 which rotates at high speed in the direction of arrow A while scattering water attached to the natural intestine casing 5 or 107 is directly detected, if detection is effected by using the proximity sensors 13 and 19, the proximity sensors 131 and 132, or the proximity sensor 161, high-accuracy detection continues.

The detecting means in accordance with the invention may not only directly detect the intestine pushing member, but also indirectly detect the position of the intestine pushing member by detecting the position of a member or a means which moves in synchronism with the intestine pushing member, e.g., the intestine-pushing-member driving means which is mechanically linked with the intestine pushing member.

Since the apparatus 1, 51, or 101 has the second detecting means 19 or 119 for changing the intestine pushing mode, a program for pushing and advancing the natural intestine casing can be simplified, and the timing for changing the manner of pushing and advancing the intestine in conformity with the size and physical properties of the natural intestine casing 5 or 107 used is adjustable. The apparatus 1, 51, or 101 may be so arranged as not to be provided with the second detecting means 19 or 119 in the same way as the apparatus 151, and the apparatus 151 may be provided with the second detecting means to the contrary. In the arrangement in which the second detecting means is not provided, the intestine pushing member 6 or 114 may be detected by the detecting means 13 or 117 without changing the manner of pushing and advancing the intestine pushing member 6 or 114 by the intestine-pushing-member driving means 7 or 115 after the start of the stuffing of the material into the natural intestine casing 5 or 107. The intestine-pushing-member driving means 7 or 115 may continue to apply, for example, the intermittently pushing and advancing force against the intestine pushing member 6 or 114, or may continue to apply, for example, the continuously pushing and advancing force against it. In the case where the intermittently pushing and advancing force is applied, the period of pushing and advancing by the intestine-pushing-member driving means 7 or 115 is preferably set so that the detection signal 14 or F is generated in a state in which the intestine pushing member 6 or 114 has pushed and advanced the rear end portion 5C or 107C, but the invention is not limited to the same. In the case where the continuously pushing and advancing force is applied, the pushing and advancing force of the intestine-pushing-member driving means 7 or 115 is set to such a weak pushing and advancing force that the shirred portion 5A or 107A is not too strongly pushed against the intestine receiving surface 9A or 116C.

In accordance with the above-described apparatus 1, 51, or 101, since the intestine pushing member is pushed and advanced only by the blowing of air, the variation of the length of the natural intestine casing pinched by and between the intestine pushing surface of the intestine pushing member and the intestine receiving surface of the intestine receiving member, which face each other with a predetermined interval, is small. Accordingly, the apparatus of the invention is suitable for detecting the length of the natural intestine casing remaining on the stuffing tube. In addition, the intestine pushing member can be pushed and advanced by the simple method of only blowing air.

Since the stuffing tube is made to project from the intestine receiving member, the interval between the intestine pushing member and the intestine receiving member at the time of the generation of the signal for stopping the supplying of the material can be made vary small or zero. Consequently, since the variation of the length of the natural intestine casing remaining on the stuffing tube at the time of the generation of the signal for stopping the supplying of the material can be suppressed to a vary small level, the sausage material can be stuffed with high accuracy up to the rear end portion of the natural intestine casing.

INDUSTRIAL APPLICABILITY

In accordance with the invention, since synchronization is established between the movement of the natural intestine casing and the stopping of the supplying of the material by causing the stuffing tube to project from the intestine receiving member, it is possible to provide a method and an apparatus for manufacturing natural intestine sausages, which excel in sanitation and make it possible to reduce the waste of the natural intestine casing and the material.

In accordance with the invention, since the signal for stopping the supplying of the material into the natural intestine casing can be generated with high accuracy by causing the stuffing tube to project from the intestine receiving member, it is possible to provide a method and an apparatus for manufacturing natural intestine sausages, which excel in sanitation and make it possible to reduce the waste of the natural intestine casing and the material.

In accordance with the invention, since the signal for stopping the supplying of the material into the natural intestine casing can be generated with high accuracy, following the advancing of the rear end portion of the natural intestine casing by a simple method, it is possible to provide a method and an apparatus for manufacturing natural intestine sausages, which excel in sanitation and make it possible to reduce the waste of the natural intestine casing and the material, and further to provide an inexpensive apparatus for manufacturing the same.

What is claimed is:

1. A method for manufacturing natural intestine sausages, comprising the steps of:

fitting a natural intestine casing over a stuffing tube having a distal end in a state in which the natural intestine casing is divided into a shirred portion and a straight portion;

discharging a material from the distal end of the stuffing tube into the natural intestine casing;

blowing out air from an air outlet of an air blowing means to an intestine pushing member so as to move the intestine pushing member toward an intestine receiving member for receiving the shirred portion over the stuffing tube so that the shirred portion advances toward the intestine receiving member, wherein the intestine pushing member is disposed between the air blowing means and the intestine receiving member and includes a hollow member having an intestine pushing surface for pushing the shirred portion, an air receiving surface disposed on an opposite side of the distal end of the stuffing tube with respect to the intestine pushing surface and receiving the air blown from the air outlet, and a hole portion formed between the intestine receiving surface and the air receiving surface to engage the stuffing tube;

pinching the shirred portion by and between the intestine pushing surface of the intestine pushing member and the intestine receiving surface of the intestine receiving member, and moving the intestine pushing member up to a position where the intestine pushing surface of the intestine pushing member faces the intestine receiving surface of the intestine receiving member at a predetermined interval;

detecting the intestine pushing member when it faces the intestine receiving member;

transporting, while constricting, the natural intestine casing stuffed with the material, by transporting means having a pair of wrapping connectors with constricting members fixed thereto at predetermined intervals;

pulling and moving the natural intestine casing over the stuffing tube by the transporting for a predetermined time after the detection, wherein the distal end of the stuffing tube projects from the intestine receiving member up to a position exceeding a common tangential line of a pair of locus circle depicted by the pair of constricting members; and stopping the discharging of the material into the natural intestine casing after the lapse of a predetermined time.

2. The method for manufacturing natural intestine sausages according to claim 1, wherein the air is blown out intermittently, at a first stage, so as to move the intestine pushing member toward the position where the intestine pushing surface faces the intestine receiving surface at the predetermined interval, and at a second stage, before the intestine pushing member reaches the position, the air is blown out continuously to further move the intestine pushing member toward the position.

3. A method for manufacturing natural intestine sausages, comprising the steps of:

fitting a natural intestine casing over a stuffing tube having a distal end, wherein the natural intestine casing is in a shirred state and has front and rear end portions;

discharging a material from the distal end of the stuffing tube into the natural intestine casing;

blowing out air from an air outlet of an air blowing means to an intestine pushing member so as to move the intestine pushing member toward the distal end of the stuffing tube over the stuffing tube so that the rear end portion of the natural intestine casing advances toward the distal end, wherein the intestine pushing member is disposed on the distal end with respect to the air blowing means and includes a hollow member having an intestine pushing surface for pushing the rear end portion of the natural intestine casing, an air receiving surface disposed on an opposite side of the distal end of the stuffing tube with respect to the intestine pushing surface and receiving the air blown from the air outlet, and a hole portion formed between the intestine receiving, surface and the air receiving surface to engage the stuffing tube;

detecting the intestine pushing member moving toward the distal end of the stuffing tube when the intestine pushing member reaches a detective position away from the distal end of the stuffing tube in a direction of the air blowing, means by a predetermined distance in a longitudinal direction of the stuffing tube; and stopping the discharging of the material into the natural intestine casing after the detection of the intestine pushing member.

4. The method for manufacturing natural intestine sausages according to claim 3, wherein the air is blown out intermittently, at a first stage, so as to move the intestine pushing member toward the detective position, and at a second stage, before the intestine pushing member reaches the detective position, the air is blown out continuously to further move the intestine pushing member toward the detective position.

5. An apparatus for manufacturing natural intestine sausages, comprising:

a stuffing tube having a distal end and adapted to stuff a material into a natural intestine casing having a rear end portion;

a material supplying means for supplying the material into the stuffing tube;

a transporting means disposed forwardly of the distal end of the stuffing tube and having a pair of wrapping connectors to transport the natural intestine casing stuffed with the material, in a direction away from the distal end;

an intestine pushing member including a hollow member having an intestine pushing surface for pushing the rear end portion of the natural intestine casing over the stuffing tube, an air receiving surface disposed on an opposite side of the distal end of the stuffing tube with respect to the intestine pushing surface, and a hole portion formed between the intestine pushing surface and the air receiving surface to engage the stuffing tube;

an intestine receiving, member including a hole portion through which the distal end of the stuffing tube is passed so that the distal end is located in such a manner as to project on a transporting-means side and an intestine receiving surface for receiving the natural intestine casing being pushed by the intestine pushing member;

an intestine-pushing-member driving means having an air blowing means with an air outlet disposed on an opposite side of the intestine receiving member with respect to the intestine pushing member, and blowing out air from the air outlet toward the air receiving surface of the intestine pushing member to move the intestine pushing member toward the intestine receiving member over the stuffing tube so that a distance between the intestine pushing, surface and the intestine receiving, surface is reduced;

a detecting means disposed at a detective position for detecting the intestine pushing member when the intestine pushing surface faces the intestine receiving surface at a predetermined interval and generating a detection signal; and a controlling means for stopping the operation of the material supplying means in response to the detection signal.

6. The apparatus for manufacturing natural intestine sausages according to claim 5, wherein the detecting means is arranged such that the detecting means detects the intestine pushing member having the intestine pushing surface facing the intestine receiving surface at the predetermined interval.

7. The apparatus for manufacturing natural intestine sausages according to claim 5, which further comprises a second detecting means which is disposed between the detecting means and the air blowing means for detecting the intestine pushing member moving toward the detective position and transmits a signal for instructing, a change of the manner of blowing out the air from the air outlet, to an air-blowing-mode changing means provided in the intestine-pushing-member driving means.

8. An apparatus for manufacturing natural intestine sausages, comprising:

a stuffing tube having a distal end and adapted to stuff a material into a natural intestine casing having a rear end portion;

a material supplying means for supplying the material into the stuffing tube;

a transporting means disposed forwardly of the distal end of the stuffing tube and adapted to transport the natural intestine casing stuffed with the material, in a direction away from the distal end;

an intestine pushing member including a hollow member having, an intestine pushing surface for pushing the rear end portion of the natural intestine casing over the stuffing tube, an air receiving surface disposed on an opposite side of the distal end of the stuffing tube with respect to the intestine pushing surface, and a hole portion formed between the intestine pushing surface and the air receiving surface to engage the stuffing tube;

an intestine receiving member including a hole portion through which the distal end of the stuffing tube is passed so that the distal end is located in such a manner as to project on a transporting-means side and an intestine receiving surface for receiving the natural intestine casing being pushed by the intestine pushing member;

an intestine-pushing-member driving means having an air blowing means with an air outlet disposed on an opposite side of the intestine receiving member with respect to the intestine pushing member, and blowing out air from the air outlet toward the air receiving surface of the intestine pushing member to move the intestine pushing member toward the intestine receiving member over the stuffing tube so that a distance between the intestine pushing surface and the intestine receiving, surface is reduced;

a detecting means disposed at a detective position for detecting intestine pushing member when the intestine pushing surface faces the intestine receiving surface at a predetermined interval and generating a detection signal; and a controlling means for stopping the operation of the material supplying means in response to the detection signal, wherein the transporting means has a pair of wrapping connectors to which constricting members for constricting the natural intestine casing stuffed with the material, are fixed at predetermined intervals, and each of the pair of wrapping connectors has a shaft, a locus circle depicted by a tip of each of the constricting members which respectively move about the shaft, and a common tangential line which is tangential to the pair of locus circles of the pair of wrapping connectors, and wherein the stuffing. tube is disposed such that the distal end thereof is located between the tangential line and the shaft.

9. The apparatus for manufacturing natural intestine sausages according to claim 5, wherein the controlling means has a means for changing a transporting speed of the transporting means in response to the detection signal.

10. The apparatus for manufacturing natural intestine sausages according to claim 5, which further comprises an intestine-receiving-member attaching member having an end face provided with a hole portion in which the intestine receiving member is attached, wherein the intestine receiving member is disposed in the intestine-receiving-member attaching member such that the intestine receiving surface is positioned flush with the end face or in such a manner as to project toward a side opposite to the transporting means side from the end face.

11. The apparatus for manufacturing natural intestine sausages according to claim 5, which further comprises an intestine-receiving-member attaching member having an end face provided with a hole portion in which the intestine receiving member is attached, wherein the intestine receiving member is disposed in the intestine-receiving-member attaching member such that the intestine receiving surface is positioned inside the hole portion.

12. The apparatus for manufacturing natural intestine sausages according to claim 7, wherein each of the detecting means and the second detecting means has a proximity sensor for detecting the intestine pushing member.

13. The apparatus for manufacturing natural intestine sausages according to claim 5, wherein the hollow member of the intestine pushing member is formed of a resin, in which a metallic annular member fits, and wherein the detecting means has a proximity sensor.

14. The apparatus for manufacturing natural intestine sausages according to claim 8, wherein hollow member of the intestine pushing member is formed of a resin, in which a metallic annular member fits, and wherein the detecting means has a proximity sensor.

15. An apparatus for manufacturing natural intestine sausages, comprising:

a stuffing tube having a distal end and adapted to stuff a material into a natural intestine casing having a rear end portion;

a material supplying means for supplying the material into the stuffing tube;

a transporting means disposed forwardly of the distal end of the stuffing tube and having a pair of wrapping connectors to transport the natural intestine casing stuffed with the material, in a direction away from the distal end;

an intestine pushing member including a hollow member formed of a resin, in which a metallic annular member fits, the hollow member having an intestine pushing surface for pushing the rear end portion of the natural intestine casing over the stuffing tube, an air receiving surface disposed on an opposite side of the distal end of the stuffing tube with respect to the intestine pushing surface, and a hole portion formed between the intestine pushing surface and the air receiving surface to engage the stuffing tube;

an intestine receiving member including a hole portion through which the distal end of the stuffing tube is passed so that the distal end is located in such a manner as to project on a transporting-means side and an intestine receiving surface for receiving the natural intestine casing being pushed by the intestine pushing member;

an intestine-pushing-member driving means having an air blowing means with an air outlet disposed on the opposite side of the intestine receiving member with respect to the intestine pushing member, and blowing out air from the air outlet toward the air receiving surface of the intestine pushing member to move the intestine pushing member toward the intestine receiving member over the stuffing tube so that a distance between the intestine pushing surface and the intestine receiving surface is reduced;

a detecting means having a proximity sensor and disposed at a detective position for detecting the metallic annular member of the intestine pushing member when the intestine pushing surface faces the intestine receiving surface at a predetermined interval and generating a detection signal; and a controlling means for stopping the operation of the material supplying means in response to the detection signal.

16. An apparatus for manufacturing natural intestine sausages, comprising:

a stuffing tube having a distal end and adapted to stuff a material into a natural intestine casing having a rear end portion;

a material supplying means for supplying the material into the stuffing tube;

an intestine pushing member including a hollow member having an intestine pushing surface for pushing the rear end portion of the natural intestine casing over the stuffing tube, an air receiving surface disposed on an opposite side of the distal end of the stuffing tube with respect to the intestine pushing surface, and a hole portion formed between the intestine pushing surface and the air receiving surface to engage the stuffing tube;

an intestine-pushing-member driving means having an air blowing means with an air outlet disposed on an opposite side of the distal end of the stuffing tube with respect to the intestine pushing member, and blowing out air from the air outlet toward the air receiving surface of the intestine pushing member to move the intestine pushing member toward the distal end of the stuffing tube over the stuffing tube;

a detecting means disposed at a detective position away from the distal end of the stuffing tube in a direction of the air blowing means by a predetermined distance in a longitudinal direction of the stuffing tube and detecting the intestine pushing member moving toward the distal end of the stuffing tube and generating a detection signal; and a controlling means for stopping the operation of the material supplying means in response to the detection signal.

17. The apparatus for manufacturing natural intestine sausages according to claim 16, wherein the hollow member of the intestine pushing member is formed of a resin, in which a metallic annular member fits, and wherein the detecting means has a proximity sensor for detecting the metallic annular member.

* * * * *